July 28, 1959 W. A. BRODRIB 2,896,948

MOUNTABLE ANIMAL TOY

Filed June 28, 1957 2 Sheets-Sheet 1

INVENTOR
WILLIAM A. BRODRIB

BY Teller & McCormick

ATTORNEYS

INVENTOR
WILLIAM A. BRODRIB
BY Teller & McCormick
ATTORNEYS

United States Patent Office 2,896,948

Patented July 28, 1959

2,896,948

MOUNTABLE ANIMAL TOY

William A. Brodrib, Terryville, Conn.

Application June 28, 1957, Serial No. 668,635

9 Claims. (Cl. 272—53.1)

The invention relates to an animal toy, preferably resembling a horse or pony, and of suitable size for mounting by a child. In accordance with the invention the toy animal includes a resilient skeleton having its parts so constructed and connected that relative motions are attained that closely resemble those of an actual animal.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figures 1, 2:
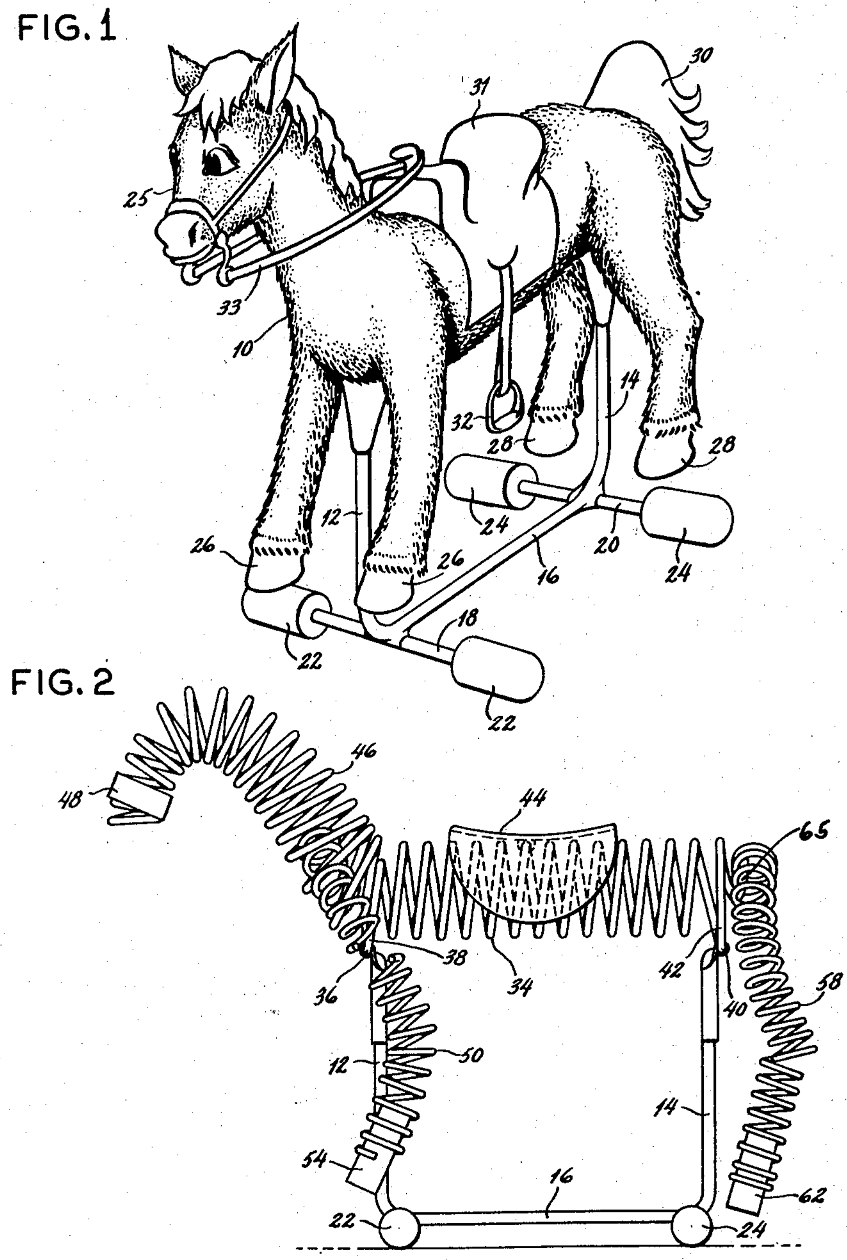
Fig. 1 is a perspective view of an animal toy embodying the invention.
Fig. 2 is a side view of the supporting frame and the skeleton of the toy shown in Fig. 1.

The perspective in Fig. 1 shows a toy animal 10 supported upon a framework which includes forward and rearward uprights or supports 12 and 14 and a longitudinal connector 16. Rigidly connected with said connector 16 are two transverse members 18 and 20 respectively provided with floor engaging elements 22, 22 and 24, 24.

The animal 10 is shown as being a horse or pony, but the invention is not so limited and is in any event not limited to a horse or pony having the particular shape and characteristics that are shown. The toy animal comprises a metallic skeleton as hereinafter described in detail, and this skeleton may be covered by a "skin" of cloth or other material, which is loose and flexible and preferably shaggy. Secured to the skeleton are a head 25, front feet 26, 26, rear feet 28, 28 and a tail 30. The toy animal is preferably of such size as to be suitable for the mounting of a child thereon and for this purpose a saddle 31 is provided, said saddle having stirrups 32. Connected with the head are reins 33 that may be grasped by a child on the saddle 32.

Figs. 2 to 5 of the drawings omit all outer portions of the animal and show primarily the skeleton and frame to which the invention more particularly relates.

The main body of the animal comprises a relatively large longitudinal spring 34 which constitutes a major part of the body of the animal, said spring having an upper central portion adapted for supporting a rider and said spring having generally upright downwardly extending portions 38 and 42 near its forward and rearward ends. A transverse horizontal pivotal connection is provided at 36 between the forward frame upright or support 12 and the bottom of the forward end portion 38 of the spring 34. A similar transverse horizontal pivotal connection is provided at 40 between the rear frame upright or support 14 and the bottom of the rearward end portion 42 of the spring 34.

Figure 4:
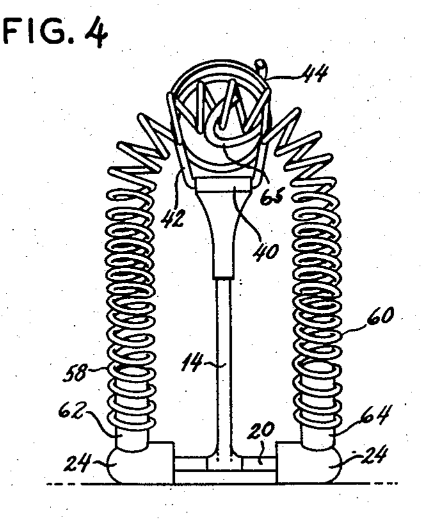
Fig. 4 is a rear view of the parts shown in Fig. 1.
Figure 3:
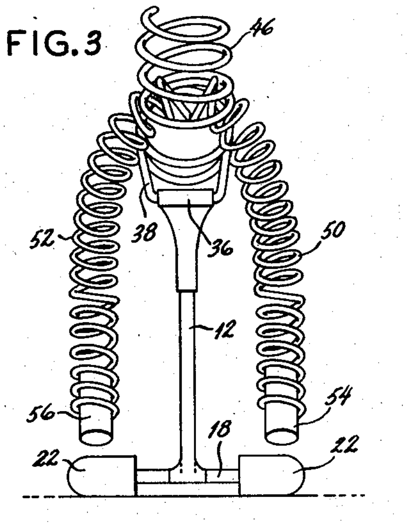
Fig. 3 is a front view of the parts shown in Fig. 1.

As shown, the body spring 34 is a relatively large coil spring preferably formed of round wire and preferably of uniform diameter. There is substantial spacing between the coils of the spring. The end coils of the spring constitute the before-mentioned downwardly extending end portions 38 and 42. The spring portion or coil 38 at the front is sometimes hereinafter referred to as the "first" coil. Said coil 38 is specially shaped as shown in Fig. 3 to provide a straight horizontal portion that serves as a pintle. The spring portion or coil 42 at the rear is sometimes hereinafter referred to as the "second" coil. Said coil 42 is specially shaped as shown in Fig. 4 to provide a straight horizontal portion that serves as a pintle.

The spring 34 has such size and has such resilience that the spring will support the weight of a child rider, within a selected weight range. When said spring 34 is a coil spring, it may be flexed downwardly by the weight to approximately the position shown by full lines in Fig. 5. It will be understood that the uprights or supports 12 and 14 and the connector 16 are of such strength and rigidity that the spacing between the pivots 36 and 40 remains substantially fixed notwithstanding the stresses resulting from the weight of a rider. As the central portion of the spring 34 is flexed downwardly, the forward first end portion or coil 38 swings rearwardly about the forward fixed axis at 36 and the rear second end portion or coil 42 swings forwardly about the fixed rearward axis at 40.

Figures 5, 6:
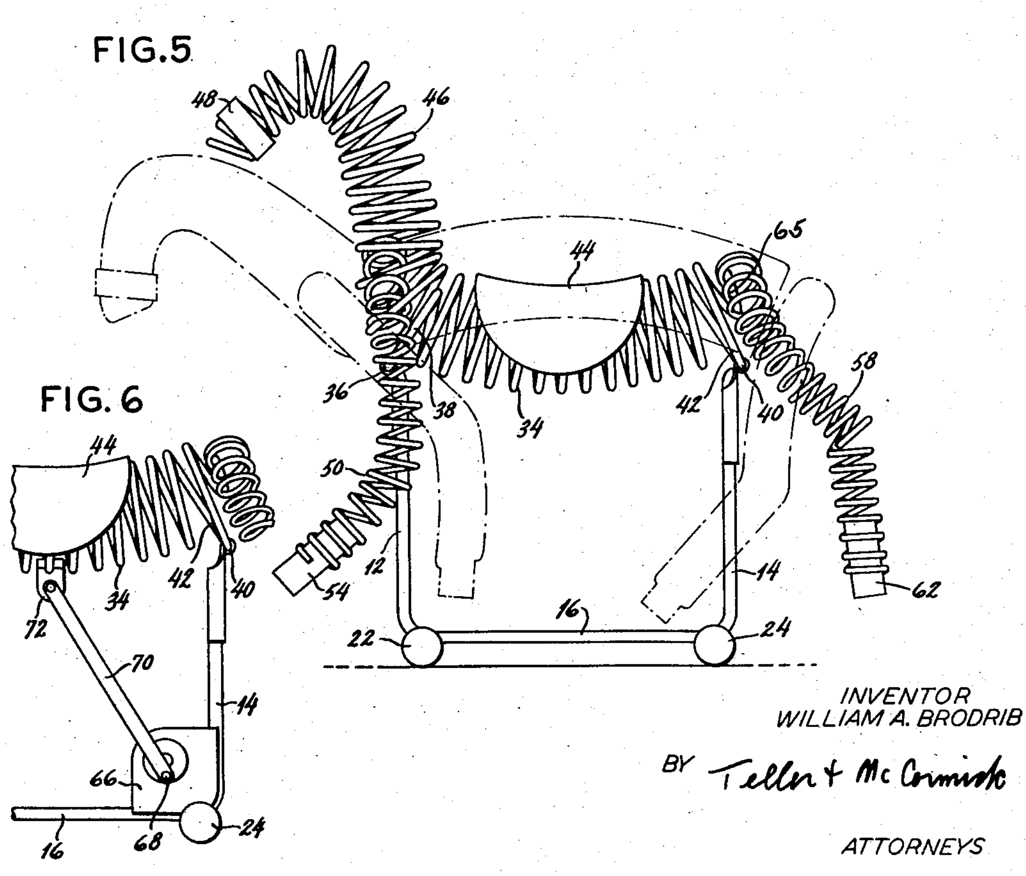
Fig. 5 is a side view similar to Fig. 2, but showing the parts in different positions.
Fig. 6 is a fragmentary side view similar to Fig. 5, but showing an alternative embodiment of the invention.

The resilience of the spring 34 tends to return it upwardly from the lower position shown in Fig. 5 and with small assistance from external forces, the spring 34 with a rider thereon will vertically reciprocate between said lower position and an upper position shown in outline by dot-and-dash lines in said Fig. 5. As the main portion of the spring so flexes and reciprocates, the first and second coils 38 and 42 oscillate respectively about the axes 36 and 40. To protect the child from possible injury, a rigid saddle plate 44 is attached to the central coil of the spring 34 at the top thereof, this plate approximately conforming to the shape of the spring in its lower position. Said saddle plate 44 is preferably attached to only one coil of the spring 34 so as to avoid any interference with the action of the spring. The saddle plate 44 is underneath the saddle 31 of the completed toy.

The head and neck portion of the skeleton is connected with the pivoted first coil 38 of the body spring 34 and extends upwardly therefrom. Said head and neck portion of the skeleton preferably includes a spring 46 which is in any event flexible forwardly and rearwardly and which is preferably a coil spring flexible in all directions. For convenience of manufacture, when the spring 46 is a coil spring, said spring may be an integral continuation of the spring 34 but this is not essential. The spring 46 is reduced in diameter toward its upper front end and it is bent to conform to the shape of the neck and head of the animal. As shown, a ring 48 is provided to facilitate the attachment of the head 25.

Inasmuch as the neck and head of the animal are carried by the pivoted first coil 38 of the spring 34, said neck and head oscillate with the oscillation of the last said coil. When said neck includes a spring such as 46, as is preferred, said spring has its own resilience and it will therefore impart vibrations or motions to the head 25 that are supplemental to the simple oscillatory movements.

The front leg portions of the skeleton are also connected with the pivoted first coil 38 of the body spring 34 and extend downwardly therefrom. Said front leg portions of the skeleton preferably include springs 50 and 52 which are in any event flexible forwardly and rearwardly and which are preferably coil springs flexible in all directions. When said springs 50 and 52 are coil springs they have a considerably smaller diameter than the springs 34 and 46. The springs 50 and 52 are bent to conform generally to the shape of the front legs of the animal, and said springs are shown as provided at their lower ends with plugs 54 and 56 to facilitate the attachment of the front feet. For convenience of manufacture, the springs 50 and 52 may be portions of a single spring bent to an inverted U-shape. Also for convenience of manufacture, the combined springs 50 and 52 may be connected with the pivoted coil 38 indirectly by means of the spring 46. As shown, the coils of the combined spring 50, 52 are interengaged with the coils of the spring 46. The two springs may be connected by solder at their points of contact.

Inasmuch as the front legs of the animal are carried by the pivoted first coil 38 of the spring 34, said legs oscillate with the oscillation of said coil about its pivotal axis. When said front legs include springs such as 50 and 52, as is preferred, said springs have their own resilience and said springs will impart vibrations or motions to the front legs and feet that are supplemental to the simple oscillatory movements.

The rear leg portions of the skeleton are connected with the pivoted second coil 42 of the body spring 34 and extend downwardly therefrom. Said rear leg portions of the skeleton are preferably springs 58 and 60 which are in any event flexible forwardly and rearwardly and which are preferably coil springs flexible in all directions. When said springs 50 and 52 are coil springs they have a considerably smaller diameter than the body spring 34. The springs 58 and 60 are bent to conform generally to the shape of the rear legs of the animal, and said springs are shown as provided at their lower ends with plugs 62 and 64 to facilitate the attachment of the rear feet. For convenience of manufacture, the springs 58 and 60 may be portions of a single spring bent to an inverted U-shape. Also for convenience of manufacture, the combined springs 58 and 60 may be connected with the pivoted coil 42 indirectly by means of the next adjacent coil 65 of the main spring 34. As shown, the coils of the combined spring 58, 60 are interengaged with a coil of the spring 34 at the rear of the pivoted coil 42. The two springs 58, 60 and 34 may be connected by solder at their points of contact.

Inasmuch as the rear legs of the animal are carried by the pivoted second coil 42 of the spring 34, said legs oscillate with the oscillation of the last said coil about its pivotal axis. When said rear legs include springs such as 58 and 60, as is preferred, said springs have their own resilience and said springs will impart vibrations or motions to the rear legs and feet that are supplemental to the simple oscillatory movements.

A child on the completed toy as shown in Fig. 1, by a "pumping" action, perhaps augmented by pulling on the reins 33, can attain a reciprocating bouncing motion wherein the skeleton body spring 34 moves between the lower and upper positions shown in Fig. 5. During each downward movement of the body spring the neck and head swing rearwardly, the front legs swing forwardly and the rear legs swing rearwardly; and during each upward movement of the body, the neck and head swing forwardly, the front legs swing rearwardly and the rear legs swing forwardly. Thus there is a reasonable approximation of a galloping motion. When the neck portion and the front and rear leg portions of the skeleton are all springs, as is preferred, their resiliency gives them vibratory or other motions additional to the simple oscillatory movements about the axes 36 and 38.

As an alternative, a motor may be provided for flexing the spring 34 and for thus effecting the described motions without any effort on the part of the user. An electric motor and connections therefor are shown schematically in Fig. 6.

As shown, an electric motor 66 is secured to the upright 14 and the connector 16. The motor is mechanically connected to drive a crank 68 which is connected by a link 70 with a member 72 secured to a central coil of said spring 34 at the bottom of said coil. When the motor is operated to rotate the crank 68, the link 70 imparts downward and upward movements to the spring 34, said spring being moved between the lower position shown by full lines in Fig. 5 and the upper position shown by dot-and-dash lines in Fig. 5.

The invention claimed is:

1. In a mountable animal toy, the combination of a frame having forward and rearward supports in fixed relationship to each other, a longitudinal spring for the body of the animal which spring has an upper central portion adapted for supporting a rider and has generally upright downwardly extending portions near its forward and rearward ends, means connecting said generally upright end portions near the bottoms thereof respectively with said forward and rearward supports for movements about forward and rearward transverse horizontal axes upon downward and upward movements of said central portion of the spring, said forward and rearward end portions swinging respectively rearwardly and forwardly upon downward movement of the central portion of the spring and said forward and rearward end portions swinging respectively forwardly and rearwardly upon upward movement of the central portion of the spring, a head and front legs connected with said forward end portion of the spring for movement therewith about said forward transverse axis, and rear legs connected with said rearward end portion of the spring for movement therewith about said rearward transverse axis.

2. In a mountable animal toy, the combination of a frame having forward and rearward supports in fixed relationship to each other, a relatively large coil spring for the body of the animal, means connecting the bottoms of longitudinally spaced first and second coils of said spring respectively with said forward and rearward supports for movements about forward and rearward transverse horizontal axes upon downward and upward movements of the central portion of the spring, said first and second coils swinging respectively rearwardly and forwardly upon downward movement of the central portion of the spring and said first and second coils swinging respectively forwardly and rearwardly upon upward movement of the central portion of the spring, a head and front legs connected with said first coil of the spring for movement therewith about said forward transverse axis, and rear legs connected with said second coil of the spring for movement therewith about said rearward transverse axis.

3. In a mountable animal toy, the combination of a frame having forward and rearward supports in fixed relationship to each other, a relatively large coil spring for the body of the animal, means connecting the bottoms of longitudinally spaced first and second coils of said spring respectively with said forward and rearward supports for movements about forward and rearward transverse horizontal axes upon downward and upward movements of the central portion of the spring, a neck and head connected with said first coil of the body spring and extending upwardly therefrom which neck and head are swingable rearwardly and forwardly upon downward and upward movement of the central portion of the body spring, front legs connected with said first coil of the body spring and extending downwardly therefrom which front legs are swingable forwardly and rearwardly upon downward and upward movement of the central portion of the body spring, and rear legs connected with said second coil of the body spring and extending downwardly therefrom which rear legs are swingable rearwardly and forwardly upon downward and upward movement of the central portion of the body spring.

4. In a mountable animal toy, the combination of a frame having forward and rearward supports in fixed relationship to each other, a longitudinal spring for the body of the animal which spring has an upper central portion adapted for supporting a rider and has generally upright downwardly extending portions near its forward and rearward ends, means connecting said generally upright end portions near the bottoms thereof respectively with said forward and rearward supports for movements about forward and rearward transverse horizontal axes upon downward and upward movements of said central portion of the spring, said forward and rearward end portions swinging respectively rearwardly and forwardly upon downward movement of the central portion of the spring and said forward and rearward end portions swinging respectively forwardly and rearwardly upon upward movement of the central portion of the spring, a neck spring flexible forwardly and rearwardly and connected with said forward end portion of the body spring and extending upwardly therefrom, a head connected with said neck spring, said neck spring and head being swingable rearwardly and forwardly upon downward and upward movement of the central portion of the body spring and being subject to additional forward and rearward vibration, front leg springs flexible forwardly and rearwardly and connected with said forward end portion of the body spring and extending downwardly therefrom, front feet connected with said front leg springs, said front leg springs and said front feet being swingable forwardly and rearwardly upon downward and upward movement of the central portion of the body spring and being subject to additional forward and rearward vibration, rear leg springs flexible forwardly and rearwardly and connected with said rearward end portion of the body spring and extending downwardly therefrom, and rear feet connected with said rear leg springs, said rear leg springs and said rear feet being swingable rearwardly and forwardly upon downward and upward movement of the central portion of the body spring and being subject to additional forward and rearward vibration.

5. In a mountable animal toy, the combination of a frame having forward and rearward supports in fixed relationship to each other, a relatively large coil spring for the body of the animal, means connecting the bottoms of longitudinally spaced first and second coils of said spring respectively with said forward and rearward supports for movements about forward and rearward transverse horizontal axes upon downward and upward movements of the central portion of the spring, a neck spring flexible forwardly and rearwardly and connected with said first coil of the body spring and extending upwardly therefrom, a head connected with said neck spring, said neck spring and head being swingable rearwardly and forwardly upon downward and upward movement of the central portion of the body spring and being subject to additional forward and rearward vibration, front leg springs flexible forwardly and rearwardly and connected with said first coil of the body spring and extending downwardly therefrom, front feet connected with said front leg springs, said front leg springs and said front feet being swingable forwardly and rearwardly upon downward and upward movement of the central portion of the body spring and being subject to additional forward and rearward vibration, rear leg springs flexible forwardly and rearwardly and connected with said second coil of the body spring and extending downwardly therefrom, and rear feet connected with said rear leg springs, said rear leg springs and said rear feet being swingable rearwardly and forwardly upon downward and upward movement of the central portion of the body spring and being subject to additional forward and rearward vibration.

6. In a mountable animal toy, the combination of a frame having forward and rearward supports in fixed relationship to each other, a relatively large coil spring for the body of the animal, means connecting the bottoms of longitudinally spaced first and second coils of said spring respectively with said forward and rearward supports for movements about forward and rearward transverse horizontal axes upon downward and upward movements of the central portion of the spring, a coil spring constituting a neck spring connected with said first coil of the body spring and extending upwardly therefrom, a head connected with said neck spring, said neck spring and head being swingable rearwardly and forwardly upon downward and upward movement of the central portion of the body spring and being subject to additional vibration, coil springs constituting front leg springs connected with said first coil of the body spring and extending downwardly therefrom, front feet connected with said front leg springs, said front leg springs and said front feet being swingable forwardly and rearwardly upon downward and upward movement of the central portion of the body spring and being subject to additional vibration, coil springs constituting rear leg springs connected with said second coil of the body spring and extending downwardly therefrom, and rear feet connected with said rear leg springs, said rear leg springs and said rear feet being swingable rearwardly and forwardly upon downward and upward movement of the central portion of the body spring and being subject to additional vibration.

7. In a mountable animal toy, the combination of a frame having forward and rearward supports in fixed relationship to each other, a relatively large coil spring for the body of the animal, means connecting the bottoms of longitudinally spaced first and second coils of said spring respectively with said forward and rearward supports for movements about forward and rearward transverse horizontal axes upon downward and upward movements of the central portion of the spring, said first and second coils swinging respectively rearwardly and forwardly upon downward movement of the central portion of the spring and said first and second coils swinging respectively forwardly and rearwardly upon upward movement of the central portion of the spring, a head and front legs connected with said first coil of the spring for movement therewith about said forward transverse axis, rear legs connected with said second coil of the spring for movement therewith about said rearward transverse axis, and a rigid saddle plate fixedly connected with said body spring near the center thereof and shaped to approximately conform to the shape of said body spring in its lowermost position.

8. In a mountable animal toy, the combination of a frame having forward and rearward supports in fixed relationship to each other, a longitudinal spring for the body of the animal which spring has an upper central portion adapted for supporting a rider and has generally upright downwardly extending portions near its forward and rearward ends, means connecting said generally upright end portions near the bottoms thereof respectively with said forward and rearward supports for movements about forward and rearward transverse horizontal axes upon downward and upward movements of said central portion of the spring, said forward and rearward end portions swinging respectively rearwardly and forwardly upon downward movement of the central portion of the spring and said forward and rearward end portions swinging respectively forwardly and rearwardly upon upward movement of the central portion of the spring, a head and front legs connected with said forward end portion of the spring for movement therewith about said forward transverse axis, rear legs connected with said rearward end portion of the spring for movement therewith about said rearward transverse axis, a motor, and means connecting said motor with said body spring near the center thereof for imparting downward and upward reciprocations to said spring.

9. In a mountable animal toy, the combination of a frame having forward and rearward supports in fixed relationship to each other, a relatively large coil spring for the body of the animal, means connecting the bottoms of longitudinally spaced first and second coils of said spring respectively with said forward and rearward supports for movements about forward and rearward transverse horizontal axes upon downward and upward movements of the central portion of the spring, a neck and head connected with said first coil of the body spring and extending upwardly therefrom which neck and head are swingable rearwardly and forwardly upon downward and upward movement of the central portion of the body spring, front legs connected with said first coil of the body spring and extending downwardly therefrom which front legs are swingable forwardly and rearwardly upon downward and upward movement of the central portion of the body spring, rear legs connected with said second coil of the body spring and extending downwardly therefrom which rear legs are swingable rearwardly and forwardly upon downward and upward movement of the central portion of the body spring, a motor, and means connecting said motor with said body spring near the center thereof for imparting downward and upward reciprocations to said spring.

References Cited in the file of this patent

UNITED STATES PATENTS

| | | |
|---|---|---|
| 1,236,039 | Baker | Aug. 7, 1917 |
| 2,379,192 | Sebel | June 26, 1945 |
| 2,437,015 | Baltz | Mar. 2, 1948 |

FOREIGN PATENTS

| | | |
|---|---|---|
| 5,426 | Great Britain | Mar. 26, 1891 |